United States Patent [19]

Peters

[11] Patent Number: 4,663,399
[45] Date of Patent: May 5, 1987

[54] POLYCARBONATE-POLYETHER BLOCK COPOLYMERS, POLYMER BLENDS CONTAINING SAME AND INTERMEDIATES FOR THE PRODUCTION THEREOF

[75] Inventor: Edward N. Peters, Lenox, Mass.

[73] Assignee: General Electric Company, Pittsfield, Mass.

[21] Appl. No.: 768,457

[22] Filed: Aug. 22, 1985

[51] Int. Cl.$^4$ .............................................. C08L 69/00
[52] U.S. Cl. ................................. 525/462; 525/469; 525/470; 528/191; 528/196; 528/202; 528/204
[58] Field of Search ............... 525/469, 408, 403, 462, 525/470; 528/191, 202, 196, 204

[56] References Cited

U.S. PATENT DOCUMENTS

| | | | |
|---|---|---|---|
| 3,030,335 | 8/1962 | Goldberg | 260/47 |
| 3,847,867 | 11/1974 | Heath et al. | 260/47 |
| 3,875,116 | 4/1975 | Heath et al. | 260/47 |
| 4,217,437 | 8/1980 | Schreckenberg et al. | 525/469 X |
| 4,252,922 | 2/1981 | Adelmann et al. | 525/439 |
| 4,286,075 | 8/1981 | Robeson et al. | 525/68 |
| 4,436,839 | 3/1984 | Behnke et al. | 521/64 |
| 4,440,902 | 4/1984 | Diery et al. | 525/404 |
| 4,510,289 | 4/1985 | Fox et al. | 525/148 |
| 4,511,693 | 4/1985 | Fox et al. | 525/67 |

*Primary Examiner*—Theodore E. Pertilla
*Attorney, Agent, or Firm*—Hedman, Gibson, Costigan & Hoare

[57] ABSTRACT

Block copolymers of the general formula $-(-$polycarbonate$-)$-G$-($polyether glycol$-)-$ wherein G is an ester aromatic carbonate and/or an ester-ester linkage, substantially free of aliphatic ether linkages are thermally stable in comparison with prior art block copolymers. They form compatible blends with a number of other thermoplastic resins to produce molded articles with improved resiliency. The block copolymers are produced from novel terminally functional end capped polyalkylene glycols.

7 Claims, No Drawings

POLYCARBONATE-POLYETHER BLOCK COPOLYMERS, POLYMER BLENDS CONTAINING SAME AND INTERMEDIATES FOR THE PRODUCTION THEREOF

The present invention relates to copolymer resins, molding compositions containing them, and intermediates useful in their production. More particularly, it is concerned with block copolymers comprising aromatic polycarbonate segments and aliphatic polyether segments, substantially free of aliphatic carbonate linkages, molding compositions comprising blends of such copolymers with thermoplastic resins, and terminally functional end capped poly(alkylene ethers) useful in the production of the block copolymers.

BACKGROUND OF THE INVENTION

Block copolymers having the general formula ᵾpolycarbonate)-G-(poly ether glycol)- wherein G is a linking unit of the formula

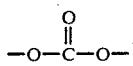

are known from Goldberg, U.S. Pat. No. 3,030,335. They are of substantial use in films, fibers, and as molding resins per se and in blends with other polymers. Behnke et al, U.S. Pat. No. 4,436,839 discloses their use in the production of membranes for dialysis, ultrafiltration or reverse osmosis. Unfortunately, the stability of such materials, as represented by a decrease in intrinsic viscosity after 24 hours, at 75° C., is less than desirable. It is believed that this is due to the presence of aliphatic carbonate linkages. Schreckenberg et al., U.S. Pat. No. 4,217,437 discloses an approach which comprises separating the aromatic carbonate (hard) segment from the polyether (soft) segment by transesterification with carbonic acid aryl esters, and Adelmen et al., U.S. Pat. No. 4,252,922 esterifies a polyether glycol with an aliphatic diacid prior to reaction with a dihydric phenol and phosgene. Such block copolymers are disclosed to be useful in blends with other resins, affording thermoplastic molding compositions with improved resilience properties, especially at low temperatures, when aromatic polycarbonates are used as the co-blending resin. Other block copolymers blended with resins in molding compositions are known from Robeson et al., U.S. Pat. No. 4,286,075, and Fox et al., U.S. Pat. Nos. 4,510,289 and 4,511,693. In all cases, however, when polycarbonate-polyethers are used, because the criticality of avoiding any substantial content of aliphatic carbonate linkages has not been recognized, the block copolymers of the prior art are unstable, especially thermally unstable.

It has now been discovered that if block copolymers of the above general formula are provided with linking units G of the formulae

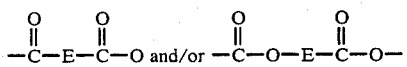

wherein E is an unsubstituted or substituted $C_6-C_{15}$ arylene or heteroarylene group, then a family of copolymers having outstanding thermal stability and ability to blend with other thermoplastics is produced. The key to such valuable materials is to avoid aliphatic carbonate linkages, and to use a family of novel terminally functional end-capped poly(alkylene glycols). The block copolymers, mixtures thereof with other polymers and the end-capped poly(alkylene glycols) are the subject matter of the present invention.

SUMMARY OF THE INVENTION

According to the present invention, there are provided polycarbonate-polyether block copolymers substantially free of aliphatic carbonate linkages, having a mean weight average molecular weight $M_w$ of between about 15,000 and 40,000, an intrinsic viscosity of about 0.5 to about 1.2 dl/g as measured in $CHCl_3$ and being of the general formula

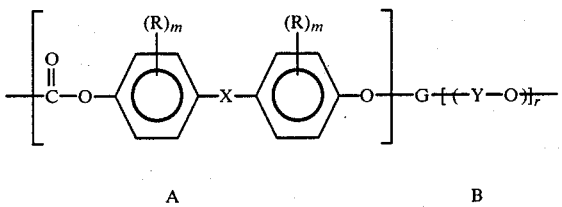

wherein repeating units B comprise soft polyether segments comprising from 5 to 60% by weight of said block copolymer and have mean number average molecular weights $M_n$ of between about 500 and 20,000, preferably between about 500 and 10,000 and especially preferably between about 1500 and 10,000. Special mention is made of those soft polyether segments having mean number average molecular weights $M_n$ of 2,000, 3,400 and 8,000 and wherein
G is

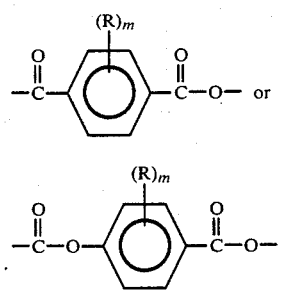

R is hydrogen, chlorine, bromine or alkyl of from 1 to 3 carbon atoms;
m is 1 or 2
X is a bond or $C_1-C_8$ alkylene, $C_2$ to $C_8$ alkylidene, $C_5$ to $C_{15}$ cycloalkylene, $C_5$ to $C_{15}$ cycloalkylidene, $SO_2$, SO, O, CO or

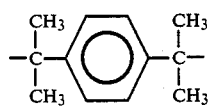

r is 6 to 450; and
Y is $C_2-C_{15}$ linear or branched alkylene.

Also provided by the present invention are molding compositions comprising a blend of
(a) a polycarbonate polyether block copolymer of the formula defined above; and
(b) at least one thermoplastic polymer compatable therewith.

In still another preferred feature, the present invention provides terminally-functional end-capped polyethers of the formula

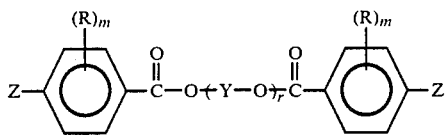

wherein
R is hydrogen, chlorine, bromine or alkyl of from 1 to 3 carbon atoms;
m is 1 or 2
Y is $C_2$ to $C_{15}$ linear or branched alkylene;
r is 6 to 450; and
Z is OH, —COCl or —COBr.

DETAILED DESCRIPTION OF THE INVENTION

Any dihydric phenol compound is useful in the practice of the invention. The dihydric phenol compounds used in connection with the preparation of the carbonate copolymers can typically be represented by the general formula:

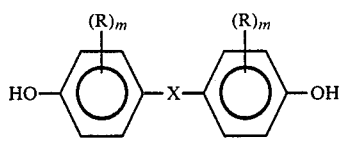

wherein R, X and m are as defined above. In the dihydric phenol compound, the substituent R may be the same or different, as may be the R. Examples of dihydric phenol compounds that may be employed in this invention include 2,2-bis(4-hydroxyphenyl)-propane (Bisphenol-A); bis-(4-hydroxyphenyl)-methane; bis-(4-hydroxy-2,6-dimethylphenyl)methane; 1,1-bis-(4-hydroxyphenyl)-ethane; 1,2-bis-(4hydroxyphenyl)-ethane; 1,1-bis-(4-hydroxy-2-chlorophenyl)ethane; 1,1-bis-(2,5-dimethyl-4-hydroxyphenyl)ethane; 1,3-bis(3-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis(4-hydroxyphenyl)-pentane; 3,3-bis-(4-hydroxyphenyl)-pentane; 2,2-bis-(4-hydroxyphenyl)-heptane; and bis-(4-hydroxyphenyl)-cyclohexane; and the like. Also included are dihydroxydiphenyls such as 4,4'-dihydroxydiphenyl. Dihydroxy aryl sufones such as those set forth in U.S. Pat. No. 3,030,335 are also useful, e.g., bis-(p-hydroxyphenyl)sulfone; 3'-chloro-4,4'-dihydroxydiphenyl sulfone; bis-(4-hydroxyphenyl) biphenyl disulfone; etc. Dihydroxy aromatic ethers such as those set forth in U.S. Pat. No. 3,030,335 are also useful. Exemplary of such dihydroxydiphenyl ethers are 4,4'-dihydroxy-2,6-dimethyldiphenyl ether; 4,4'-dihydroxy-2,5-dimethyldiphenyl ether; 4,4'-dihydroxy-3,3'-di-isobutyldiphenyl ether; 4,4'-dihydroxy-3,3'-diisopropyldiphenyl ether; 4,4'-dihydroxy-3,3'-dichlorodiphenyl ether; 4,4'-dihydroxy-2,3'-dibromodiphenyl ether; etc. Mixtures of the dihydric phenols can also be employed and where dihydric phenol is mentioned herein, mixtures of such materials are considered to be included.

The terminally-functional end capped poly alkylene glycols used in this invention are derived from any aliphatic dihydroxy compound or glycol. These are reacted with the corresponding compounds of the formula

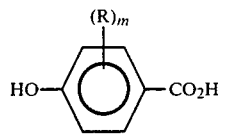

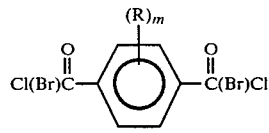

or their obvious chemical equivalents. The aliphatic dihydroxy compounds or glycols can typically be represented by the formula:

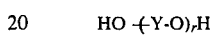

wherein Y and r are as above defined. Y can be selected from the group consisting of alkylene and alkylidene residues such as methylene, ethylene, propylene, propylidene, isopropylidene, butylene, butylidene, isobutylidene, amylene, isoamylene, amylidene, isoamylidene, etc. Y is preferably —$CH_2CH_2$— or —$CH_2CH_2CH_2CH_2$—. Typically, the polyalkylene oxide diols will have number average molecular weights of up to about 20,000, preferably from about 500 to 18,000, maximum.

Generally speaking, the carbonate copolymers useful in connection with this invention are prepared by reacting a dihydric phenol compound, a carbonate precursor such as phosgene, a carbonate ester, etc. and an aliphatic dihydroxy material or glycol.

When a carbonate ester is used, the materials are reacted at temperatures of from about 150° C. to 300° C. or higher for times varying from 1 to 15 or more hours.

In one manner of proceeding the reaction is carried out using phosgene or phosgene-like dibasic acid halide in an organic basic material such as a tertiary amine (e.g. pyridine, N,N-dimethylaniline, quinoline, etc.). The base can be used undiluted or diluted with inert solvents, for example hydrocarbons such as benzene, toluene, xylene, etc., and halocarbons such as chloroform, chlorobenzene, methylene chloride, etc. Tertiary amines are advantageous in that they serve to catalyze the reaction, are good solvents, and act as acceptors for halogen acid given off during the reaction. Although the phosgene reaction can be carried out over a wide range of temperatures, for example from below 0° C. to over 100° C., the reaction proceeds satisfactorily at 25° to 50° C. Since the reaction is exothermic, the rate of phosgene addition can be used to control the reaction temperature. Substantially, equimolar amounts of phosgene can be used, although an excess of up to 1.5 moles or more may be employed. The concentration of the dihydroxy reactants in solvent can also be varied, although it is preferred for convenience to use a solution containing from about 1% to 25% by weight of dihydroxy compounds.

The reaction can be carried out by dissolving the dihydroxy reactants in the base, such as pyridine, and then bubbling phosgene into the stirred solution at the desired rate. The copolymer formed is separated and purified by any suitable means, as by pouring the reaction product into a stirred liquid capable of effecting precipitation, for example: hydrocarbons, alcohols, etc. The precipitation can also be carried out by the addition of a non-solvent to the copolymer solution. Anhydrous precipitants are preferred but water can also be used. After filtration, the precipitate is washed with a material capable of removing pyridine and pyridine hydrochloride to yield, upon drying, a finely divided product. Isopropanol is conveniently used both as a precipitating and washing agent.

Suitable phosgene-like dibasic acid halides, in addition to phosgene, include, for example, dibromo and diiodocarbonyls as well as the bishaloformates of dihydric phenols (e.g. bischloroformates of hydroquinone, Bisphenol-A etc.) or glycols (e.g. bischloroformates of ethylene glycol, neopentyl glycol, polyethylene glycol etc.). Other carbonate precursors will occur to those skilled in the art.

Copolymers can also be prepared by adding phosgene to an aqueous alkaline solution or suspension of the dihydroxy reactants. This is preferably done in the presence of inert solvents such as methylene chloride, benzene, toluene and the like. Quaternary ammonium compounds can be used to catalyze the reaction.

The block copolymers are preferably prepared in a heterogeneous phase system "the interfacial condensation" technique by reacting an aqueous sodium bisphenolate solution with phosgene in the presence of methylene chloride. This will be exemplified hereinafter.

The preparation in a heterogeneous phase system by the phase boundary process is described, for example, by S. H. Merrill, J. Polymer Sci., 55, 343 (1961), and the preparation in a homogeneous phase system by the pyridine process is described, for example, by K. P. Perry, W. J. Jackson, Jr. and J. R. Caldwell, Ind. Eng. Chem. Prod. Res. Develop., 2, 246 (1963).

Working up is carried out by methods known for polycarbonates, for example by evaporating off the solvent in devolatilization extruders.

The molding compositions according to the invention, consisting of polycarbonate-polyether block copolymer resins and a second compatible resin are prepared in conventional mixing units, such as kneaders and screw extruders, or by mixing solutions of the two components and then isolating the molding composition via a devolatilization exruder.

The mixtures can be employed as films and shaped articles in all cases where, on the one hand, high notched impact strengths at low temperatures, high toughness properties at relatively high wall thicknesses, and transparency are required.

When used herein and in the appended claims, "compatible" refers to blends or compositions of polymers in which the component polymers avoid stratification of the components during or after processing. Compatibility is of great significance for an admixture of different resins, because it ensures homogeneity, and a unity of properties, which greatly facilitates subsequent processing and use of the composition. Incompatible blends separate into phases containing predominantly their own separate components, and thus may be considered to be immiscible. This characteristic, combined with the often low physical attraction forces across the phase bounderies, usually causes immiscible/incompatible blend systems to have poor mechanical properties, thus preventing the preparation of useful polymer blends. When blends of two polymers exhibit a single glass transition temperature (Tg), it generally signifies the resin components are compatible. However, a single Tg is not a necessary condition for a compatible blend.

In accordance with the present invention there are provided thermoplastic compositions comprising a polycarbonate polyether copolymer resin and a thermoplastic addition or condensation polymer resin which have been melt admixed to provide a compatible composition.

The polymers which are mixed with the polycarbonate polyether block copolymer to form the compatible composition are comprised of units derived from repeat groups including a heterogroup. Heterogroups are groups containing atoms besides carbon and hydrogen; such atoms are designated heteroatoms. The term hetero group also contemplates the heteroatoms themselves.

The polymers containing hetero groups can have the heterogroups (A) as pendant groups on the polymer chains or as linkages in the polymer chain:

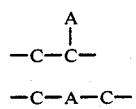

Typical examples of heteroatoms are oxygen, sulfur, nitrogen, halogen, etc. Examples of heterogroups are

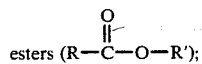

nitrile (R—CN);

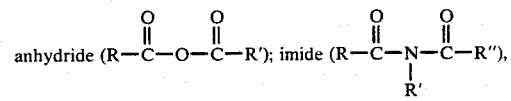

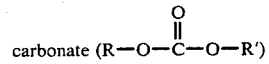

and the like. From the foregoing, it follows that polymers within the scope of this invention, without limitation, are illustrated by styrene resins, alkyl acrylate resins, vinyl halide polymers or combinations thereof.

Once formed, the product composition may be employed (or further processed) in conventional manner. Its applications include, for example, tough films useful in packaging. They may also be injection molded or extruded to produce a variety of useful thermoplastic articles.

In addition to at least two polymeric components, the present compositions may contain any of the conventional additives, for the purposes for which they are known. These additives include fire-retardants, impact modifiers, pigments, tints, reinforcing materials such as glass fiber, antioxidants and the like. They may be combined with the compositions either before or after melt mixing.

Addition polymers suitable for admixing with the polycarbonate are selected from the group consisting of styrene resins, alkyl acrylate resins, vinyl halide polymers, or combinations thereof.

(a) Styrene Resin

Styrene resins suitable for use herein are ABS type polymers, the molecules of which contain two or more polymeric parts of different compositions that are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

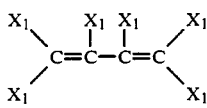

wherein $X_1$ is selected from the group consisting of hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are monovinylaromatic hydrocarbons. The monovinylaromatic monomers utilized are generically described by the following formula:

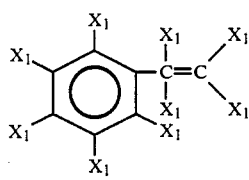

wherein $X_1$ is as previously defined. Examples of the monovinylaromatic compounds and alkyl-, cycloalkyl-, aryl-, alkaryl-, aralkyl-, alkoxy-, aryloxy-, and other substituted vinylaromatic compounds include styrene, 4-methylstyrene; 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, mixtures thereof, and the like. The preferred monovinylaromatic hydrocarbons used are styrene and/or alpha-methylstyrene.

A second group of monomers that may be polymerized in the presence of the prepolymerized backbone are acrylic monomers such as acrylonitrile, substituted acrylonitrile, and/or acrylic acid esters, exemplified by acrylonitrile, and alkyl acrylates such as methyl methacrylate.

The acrylonitrile, substituted acrylonitrile, or acrylic acid esters are described generically by the following formula:

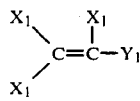

wherein $X_1$ is as previously defined and $Y_1$ is selected from the group consisting of cyano and carbalkoxy wherein the alkoxy group of the carbalkoxy contains from one to about twelve carbon atoms. Examples of such monomers include acrylonitrile, ethacrylonitrile, methacrylonitrile, alpha-chloroacrylonitrile, alpha-chloroacrylonitrile, alpha-bromoacrylonitrile, and alpha-bromoacrylonitrile, methyl acrylate, methyl methacrylate, ethyl acrylate, butyl acrylate, propyl acrylate, isopropyl acrylate and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprises from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where alpha-methylstyrene (or other monomer) is substituted for the styrene in the composition used in preparing the graft polymer, a certain percentage of the composition may be an alpha-methylstyrene-acrylonitirle copolymer. Also, there are occasions where a copolymer, such as alpha-methylstyrene-acrylonitrile, is added to the graft polymer copolymer blend. When a graft is polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, 2-ethylhexylacrylate, and the like. Additionally, minor amounts of a diene may be copolymerized in the acrylate rubber backbone to yield improved grafting with the matrix polymer.

These resins are well known in the art and many are commercially available.

(b) Alkyl Acrylate Resin

The alkyl acrylate resin which may be used herein includes a homopolymer of methyl methacrylate (i.e., polymethyl methacrylate) or a copolymer of methyl methacrylate with a vinyl monomer (e.g., acrylonitrile, N-allylmaleimide, or N-vinyl maleimide), or an alkyl acrylate or methacrylate in which the alkyl group contains from 1 to 8 carbon atoms, such as methyl acrylate, ethyl acrylate butyl acrylate, ethyl methacrylate and buty methacrylate. The amount of methyl methacrylate is greater than about 70% by weight of this copolymer resin.

The alkyl acrylate resin may be grafted onto an unsaturated elastomeric backbone, such as polybutadiene, polyisoprene, and/or butadiene or isoprene copolymers. In the case of the graft copolymer, the alkyl acrylate resin comprises greater than about 50 weight percent of the graft copolymers.

These resins are well known in the art and are commercially available.

The methyl methacrylate resins have a reduced viscosity of from 0.1 to about 2.0 dl/g in a one percent chloroform solution at 25° C.

(c) Vinyl Chloride Polymers

The vinyl chloride polymers suitable for use herein are polyvinyl chloride and copolymers of vinyl chloride and copolymers of vinyl chloride with olefinically unsaturated polymerizable compounds which contain at least 80 percent by weight of vinyl chloride incorporated therein.

Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and alpha-alkyl-acrylate and their alkyl esters, amides and nitriles, methacrylic acid, maleic acid or anhydride, methyl methacrylate, ethyl acrylate, 2-ethyl hexylacrylate, butyl methacrylate, 2-hydroxypropyl acrylate, acrylamide. N-methyl acrylamide, acrylonitrile and methacrylonitrile, aromatic vinyl compounds, such as styrene and vinyl napthalene and olefinically unsaturated hydrocarbons such as ethylene-bicyclo[2,2,2]-hept-2-ene and bicyclo-[2,2,1]hepta-2,5-diene. Polymerized vinyl acetate may be hydrolyzed to provide vinyl alcohol moieties in the polymer.

These vinyl chloride polymers are well known in the art and can be prepared by the usual methods of solution, emulsion, suspension, bulk or mass polymerization.

Vinyl chloride polymers which have molecular weight of from about 40,000 to about 60,000 are preferred.

(d) Polyesters

Polyesters which are suitable for use herein are derived from an aliphatic or cycloaliphatic diol, or mixtures thereof, containing from 2 to about 10 carbon atoms and at least one aromatic dicarboxylic acid. The polyesters which are derived from an aliphatic diol and an aromatic dicarboxylic acid have repeated units of the following general formula:

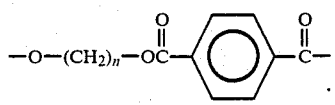

wherein n is an integer of from 2 to 14.

The preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). These can be made following the teachings of, for example, U.S. Pat. Nos. 2,465,319 and 3,047,539.

The polyesters which are derived from a cycloaliphatic diol and an aromatic dicarboxylic acid are prepared by condensing either the cis- or trans-isomer (or mixtures thereof) of, for example, 1,4-cyclohexanedimethanol with an aromatic dicarboxylic acid so as to produce a polyester having recurring units of the following formula:

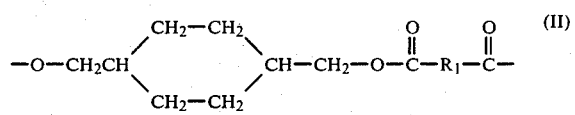

wherein the cyclohexane ring is selected from the cis- and trans-isomers thereof and $R_1$ represents an aryl radical containing 6 to 20 carbon atoms and which is the decarboxylated residue derived from an aromatic dicarboxylic acid.

Examples of aromatic dicarboxylic acids represented by the decarboxylated residue $R_1$ in formula II are isophthalic or terephthalic acid; 1,2-di(p-carboxyphenyl) ethane, 4,4′-dicarboxydiphenyl ether, etc., and mixtures of these. All of these acids contain at least one aromatic nucleus. Acids containing fused rings can also be present, such as in 1,4 or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids.

Still another preferred polyester is a copolyester derived from a cyclohexane dimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl./g. as measured in a 60:40 phenol/tetrachloroethane mixture of similar solvent at 23°-30° C.

(e) Aromatic Polycarbonate

Thermoplastic aromatic polycarbonates that can be employed as the thermoplastic heterogroup containing polymer herein are homopolymers and copolymers and mixtures thereof, which have an intrinsic viscosity of from about 0.4 to about 1.0 dl/g. as measured in methylene chloride at 25° C. The polycarbonates are prepared by reacting a dihydric phenol with a carbonate precursor. Typical of some of the dihydric phenols that may be employed are bisphenol-A, bis(4-hydroxyphenyl)methane, 2,2-bis(4-hydroxy-3-methylphenyl)propane, 4,4-bis(4-hydroxyphenyl)heptane, 2-2(3,5,3′,5′-tetrabromo- 4,4'-dihydroxydiphenyl)propane, 3,3'-dichloro-4,4'-dihydroxydiphenyl)methane, and the like. Other dihydric phenols of the bisphenol type are described above.

It is, of course, possible to employ two or more different dihydric phenols, or a copolymer of a dihydric phenol, with a glycol or with hydroxy or acid terminated polyesters, or with a dibasic acid, in the event a carbonate copolymer or inter-polymer rather than a homopolymer is desired for use in the preparation of the aromatic carbonate polymer containing heterogroup.

The aromatic polycarbonate polymers may be prepared by methods well known in the art, by using phosgene or haloformate and by employing a molecular weight regulator, an acid acceptor and a catalyst. The molecular weight regulators which can be employed in carrying out the process include monohydric phenols, such as phenol, para-tertiary-butylphenol, para-bromophenol, primary and secondary amines, etc. Preferably, a phenol is employed as the molecular weight regulator.

The polycarbonates can be prepared in one-phase (homogeneous solution) or two-phase (interfacial) systems when phosgene or a haloformate are used. Bulk reactions are possible when the diarylcarbonate precursors are used.

(f) Poly(arylether)s

Poly(aryl ether) resin components suitable for use herein are linear, thermoplastic polyarylene polyether polysulfones, wherein the arylene units are interspersed with ether and sulfone linkages. These resins may be obtained by reaction of an alkali metal double salt of a dihydric phenol and a dihalobenzenoid compound, either or both of which contain a sulfone or ketone linkage, i.e., $-SO_2-$ or $-CO-$ between arylene groupings, to provide sulfone or ketone units in the polymer chain in addition to arylene units and ether units. The polysulfone polymer has a basic structure comprising recurring units of the formula:

$$-O-E-O-E'-$$

wherein E is the residuum of the dihydric phenol and E' is the residuum of the benzenoid compound having an inert electron withdrawing group in at least one of the positions ortho and para to the valence bonds; both of said residua are valently bonded to the ether oxygens through aromatic carbon atoms. Such polysulfones are included within the class of polyarylene polyether resins described in U.S. Pat. Nos. 3,264,536 and 4,108,837, for example.

The residuum of a dihydric phenol, E, is derived from dinuclear phenols having the structure:

HO—(—AR—R₁—AR—)—OH wherein Ar is an aromatic group and preferably is a phenylene group, A and $A_1$ may be the same or different inert substitutent groups, such as alkyl groups having from 1 to 4 carbon atoms, halogen atoms, i.e., fluorine, chlorine, bromine or iodine or alkoxy radicals having from 1 to 4 carbon atoms, r and $r_1$ are integers having a value of from 0 to 4, inclusive, and $R_1$ is representative of a bond between aromatic carbon atoms as in dihydroxydiphenyl, or is a divalent radical, including, for example, CO, O, S, S—S, $SO_2$, or a divalent organic hydrocarbon radical, such as alkylene, alkylidene, cycloalkylene, or the halogen, alkyl, aryl, alkaryl, or like substituted alkylene, alkylidene and cycloalkylene radicals as well as alkarylene and aromatic radicals and a ring fused to both Ar groups.

Typical preferred polymers have recurring units having the following structure:

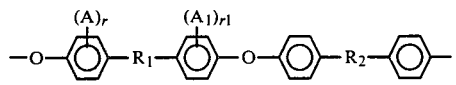

as described in U.S. Pat. No. 4,108,837, supra.

The poly(aryl ether)s have a reduced viscosity of from about 0.4 to about 1.5 dl/g as measured in an appropriate solvent at an appropriate temperature depending on the particular polyether, such as in methylene chloride at 25° C.

(g) Copolyetherester Block Copolymer

Copolyetheresters suitable for use herein are well known in the art and are described in, for example, U.S. Pat. Nos. 3,784,520 and 3,766,146.

The polyester comprises a multiplicity of recurring intralinear long chain and short chain ester units connected head-to-tail through ester linkages, said long chain ester units being represented by the following structure.

said short chain ester units being represented by the following structure:

wherein G is a divalent radical remaining after removal of terminal hydroxy groups from a poly(alkylene oxide) glycol having a molecular weight of from about 400 to about 3500; D is a divalent radical remaining after removal of hydroxyl groups from a low molecular weight diol having a molecular weight of less than about 250; and $R_3$ is a divalent radical remaining after removal of carboxyl groups from a dicarboxylic acid having a molecular weight of less than about 300, with the proviso that the short chain ester units constitute from about 25 to about 65% by weight of the copolyester, a least about 70% of the $R_3$ groups are 1,4-phenylene radicals, at least about 70% of the D groups are 1,4-butylene radicals, and the sum of the percentages of the $R_3$ groups which are not 1,4-phenylene radicals and the D groups which are not 1,4-butylene radicals does not exceed about 30%.

The term "long chain ester units" as applied to units in a polymer chain refers to the reaction product of a long chain glycol with a dicarboxylic acid. Such "long chain ester units", which are repeating units in the copolyester herein, correspond to the structure (a) above. The long chain glycols may be poly(alkylene oxide) glycols having a molecular weight between about 400 and about 3500, preferably between about 600 and about 2000. Copolyesters prepared from poly(alkylene oxide)glycols having a molecular weight between about 600 to about 2000 are preferred.

The term "short chain ester units" as applied to units in a polymer chain refers to low molecular weight compounds or polymer chain units having molecular weight of less than about 550. They are made by reacting a low molecular weight diol, (below about 250), with a dicarboxylic acid, to form ester units represented by structure (b) above.

Included among the low molecular weight diols, (other than 1,4-butanediol), which react to form short chain ester units are acyclic, alicyclic and aromatic dihydroxy compounds. Preferred are diols with from 2 to 15 carbon atoms, such as ethylene, propylene, isobutylene, tetramethylene, pentamethylene, 2,2-dimethyltrimethylene, hexamethylene and decamethylene glycols, dihydroxy cyclohexane, cyclohexanedimethanol, resorcinol, hydroquinone, 1,5-dihydroxy naphthalene, etc. Especially preferred are aliphatic diols containing from 2 to 8 carbon atoms. Included among the bisphenols which can be used as bis(p-hydroxy)diphenyl, bis(p-hydroxyphenyl) methane, and bis(p-hydroxyphenyl)propane.

Dicarboxylic acids (other than terephthalic acid) which are reacted with the foregoing long chain glycols or low molecular weight diols to produce the copolyesters are aliphatic, cycloaliphatic or aromatic dicarboxylic acids.

Representative aliphatic and cycloaliphatic acids which may be used are sebacic acid, 1,3-cyclohexane dicarboxylic acid, 1,4-cyclohexane dicarboxylic acid, adipic acid, glutaric acid, succinic acid, carbonic acid, cyclopentanedicarboxylic acid, decahydro-1,5-naphthylene dicarboxylic acid and 4,4-bicyclohexyl dicarboxylic acid. Preferred aliphatic acids are cyclohexane-dicarboxylic acids.

Representative aromatic dicarboxylic acids which may be used include phthalic, terephthalic and isophthalic acids, substituted dicarboxy compounds with two benzene nuclei, such as bis(p-carboxyphenyl)methane and p-carboxyphenyl/oxybenzoic acid. Among the aromatic acids, those with from 8 to 16 carbon atoms are preferred, particularly the phenylene dicarboxylic acids, i.e., terephthalic and isophthalic acids.

Preferably, at least about 70 mole percent of the dicarboxylic acid incorporated into the polymer is terephthalic acid and at least about 70 mole percent of the low molecular weight diol incorporated into the polymer is 1,4-butanediol. Thus, at least 70% of the $R_3$ groups in structures (a) and (b) above are 1,4-phenylene radicals and at least about 70% of the D groups in formula b above are 1,4-butylene radicals.

The most preferred copolyesters are those prepared from dimethylterephthalate, 1,4-butanediol and poly(tetramethylene oxide) glycol having a molecular weight of from about 600 to about 1500.

The copolyetheresters described herein can be made conveniently by a conventional ester interchange reaction by methods well known in the art and as described in, for example, U.S. Pat. Nos. 3,784,520 and 3,766,146.

(h) Polyhydroxyether

The thermoplastic polyhydroxyethers which may be used herein have the following general formula:

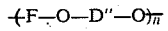

where F is the radical residuum of a dihydric phenol, D" is a radical residuum of an epoxide selected from mono- and diepoxides and which contain from 1 to 2 hydroxyl groups, and n is an integer which represents the degree of polymerization and is at least about 30 and preferably is above about 80.

In general, thermoplastic polyhydroxyethers are prepared by contacting, under polymerization conditions, a dihydric phenol and an epoxide containing from 1 to 2 epoxide groups in substantially equimolar amounts by methods well known in the art.

These polyhydroxy ethers are prepared by methods well known in the art, such as those described in, for example, U.S. Pat. Nos. 3,238,087; 3,305,528; 3,294,747; and 3,277,051.

(i) Polyimides

Polyimides prepared from the reaction between substantially equal molar amounts of aromatic bis(ether anhydride)s of the formula,

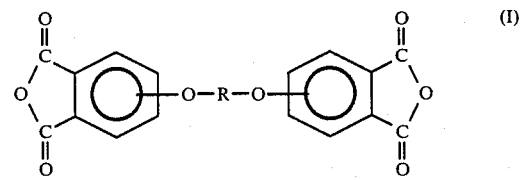

wherein R is an arylene radical of, for example 6 to 12 carbon atoms, and organic diamine of the formula, $$H_2NR^1NH_2$$

wherein $R^1$ is alkylene, arylene, and the like of 2 to 30 carbon atoms, in the presence of a phenolic solvent which produces a solution which remains homogeneous when the mixture is allowed to cool to room temperature. There is obtained a solution of polyimide in the phenolic solvent. The polyimide can be recovered by effecting its separation from the phenolic solvent mixture with a non-solvent for polyimide, such as methanol.

These polyimides are prepared by methods well known in the art such as those described in, for example, U.S. Pat. No. 3,917,643.

(j) Polyphenylene Ethers

The polyphenylene ethers generally comprise structural units having the formula:

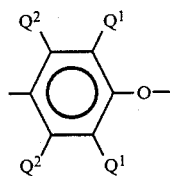

In each of said units independently, each $Q^1$ is independently hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are known in the art. Also contemplated are graft copolymers, including those prepared by grafting onto the polyphenylene ether chain such vinyl monomers as acrylonitrile and vinylaromatic compounds (e.g., styrene), and such polymers as polystyrenes and elastomers. Other suitable polyphenylene ethers are the coupled polyphenylene ethers in which the coupling agent is reacted with the hydroxy groups of two polyphenylene ether chains to increase the molecular weight of the polymer. Illustrative coupling agents are low molecular weight polycarbonates, quinones, heterocycles and formals.

The polyphenylene ether generally has a molecular weight (number average, as determined by gel permeation chromatography, whenever used herein) within the range of about 5,000–40,000; its intrinsic viscosity is most often in the range of about 0.45–0.5 dl./g., as measured in chloroform at 25° C.

The polyphenylene ethers may be prepared by known methods, typically by the oxidative coupling of at least one corresponding monohydroxyaromatic compound. A particularly useful and readily available monohydroxyaromatic compound is 2,6-xylenol (wherein each $Q^1$ is methyl and each $Q^2$ is hydrogen), whereupon the polymer may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound such as a copper, manganese or cobalt compound, usually in combination with various other materials.

A first class of preferred catalyst systems consist of those containing copper. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alpha-hydroxyoximes (monomeric and polymeric), o-hydroxyaryl oximes and beta-diketones. Also useful are cobalt-containing catalyst systems.

DESCRIPTION OF THE PREFERRED EMBODIMENTS

The following examples illustrate the invention. It is not intended that the claims be construed as limited thereto.

EXAMPLE 1

In a 1-liter flask equipped with a nitrogen inlet, vacuum, thermometer and stirrer were placed 500 g (0.0625 moles) of poly(ethylene glycol) (MW 8,000), 19.02 g. (0.125 moles) of p-hydroxy methyl benzoate, 2 ml. of tetrabutyl titanate and 0.5 g of Mg(OAc). The mixture was heated under nitrogen until melted (80°–100° C.). Then, under vacuum, the mixture was heated to 230° C. slowly. The mixture was cooled under a vacuum and transferred to a storage container while still warm and fluid.

The compound produced had the formula

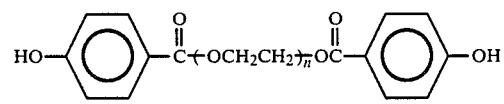

wherein n is approximately 180.

EXAMPLE 2

In a 2-liter flask is placed 70 g. (0.00875 moles) of dry poly(ethylene glycol) (MW 8000), 5.0 g. (0.0246 mole) of terephthaloyl chloride and 1 ml. of triethylamine. The mixture was heated to 80° C. for 15 minutes, then cooled.

The compound produced is of the formula

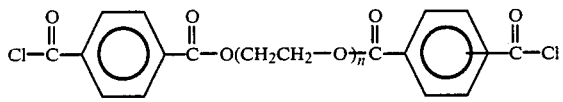

wherein n is approximately 180.

EXAMPLE 3

In a dry 2-liter flask equipped with a mechanical stirrer, distillation set-up, thermometer and addition funnel was placed 200 g. (0.985 mole) of terephthaloyl chloride. One thousand grams (0.294 mole) of poly(ethylene glycol) (MW 3400) was dissolved in 1.5 l. of methylene chloride and added slowly to the flask. The methylene chloride was distilled off, then the temperature was raised to about 100° C. and the addition was completed in about 3 hours. After 2 additional hours at 100°–110° C., the reaction mixture was cooled.

The compound produced was of the formula

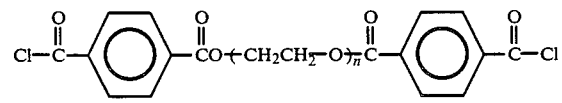

where n is approximately 80.

EXAMPLE 4

In a dry 2-liter flask was placed 300 g. (1.478 moles) of terephthaloyl chloride and heated to 60°–70° C. A dry solution of 1000 g. (0.5 mole) of poly (tetramethylene glycol) (molecular weight 2000) in 1.5-liters of methylene chloride was added slowly. After adding approximately 500 ml. of solution the temperature was raised to about 100° C. The methylene chloride was distilled off during the addition in order to maintain the temperature at the desired level. The addition was carried out over a 3 hour period. Heating at 100°–110° C. was continued for 2 hours and the mixture was then cooled.

The compound produced was of the formula

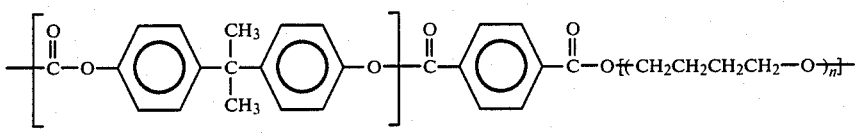

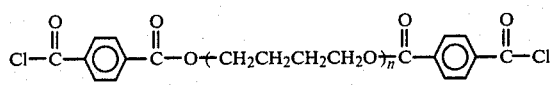

wherein n is approximately 28.

EXAMPLE 5

In a 2-liter flask equipped for interfacial condensation was added the end-capped polyethylene glycol of Example 1, 70 g. (0.00875 mole), 100 g. (0.438 mole) of bisphenol-A, 500 ml. of methylene chloride, 2 ml. of methylene chloride and 400 ml. of water. The pH was raised to 11 and the mixture was phosgenated at 0.75 g./min. for 50 minutes. The layers were separated, washed with water, washed with hydrochloric acid, and washed with water to pH 7. The block co-polymer was precipitated in hot water (85°–90° C.). It had an intrinsic viscosity of 0.92 dl./g. (in CHCl$_3$).

The product contained units of the formula

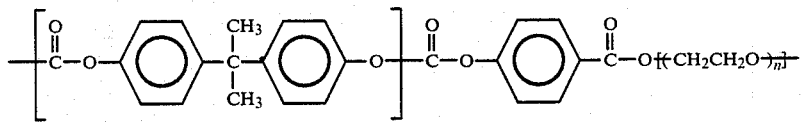

EXAMPLE 6

The end-capped polyethylene glycol prepared by the procedure of Example 2 was cooled, 100 g. (0.438 moles) of bisphenol-A, 500 ml. of methylene chloride, 1 ml. of triethylamine were added, and stirred for one hour. Then 400 ml. of water was added, the pH raised to 11 and the mixture was phosgenated at 0.75 g./min. for 50 minutes. The product was isolated as described in Example 5 and had an intrinsic viscosity of 0.75 dl./g. (in CHCl$_3$).

The product contained units of the formula

EXAMPLE 7

The end-capped polytetramethylene glycol prepared by the procedure of Example 4, 71 g. (0.035 moles), 1.5 g. p-t-butylphenol (0.0099 mole) as a chain terminator, 71 g. (0.311 moles) of bisphenol-A, 1 ml. of triethylamine, 450 ml. of water and 550 ml. of methylene chloride were phosgenated for 55 minutes at pH 11 at 0.75 g./min. in accordance with the interfacial condensation procedure described in Example 5. The product had an intrinsic viscosity of 0.77 dl./g. (in CHCl$_3$).

The product contained units of the formula

By standard test methods, the tensile modulus is 25,000 psi, the tensile strength is 5400 psi, and elongation at break is 440%, a desirable feature indicating elatomeric character at ambient temperatures.

EXAMPLE 8

In a reactor are added 1000 g. (4.380 moles) of bisphenol-A, 8.5 liters of methylene chloride and 15 ml. of triethylamine. The pH is raised to 11 and one-fourth of a solution of 1100 g. (0.324 moles) of the end-capped polyethylene glycol of Example 3 in 1.5 liters of methylene chloride was added over a 10 minutes period. Phosgene was then added at 10 g./min. for 10 minutes. Then another ¼th of the end-capped polyethylene glycol solution was added over 10 minutes. After 10 additional minutes of stirring, 9.0 g. of p-t-butyl phenol was added. Then phosgene was re-introduced at 10 g./min. for 10 minutes, followed by addition of another ¼ of the end-capped polyglycol solution. Phosgene was reintroduced at 10 g./min. Then the remaining ¼th of the end-capped polyglycol solution was added and finally phosgene was reintroduced at 10 g./min. for 17 minutes. The organic layer was separated, washed, neutralized (HCl wash, then 2H$_2$O washes) and the polymer was isolated by steam precipitation then dried. 1584 grams were obtained with an intrinsic viscosity of 0.69 dl./g.

The block copolymer contained units of the formula

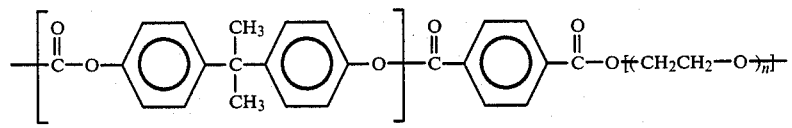

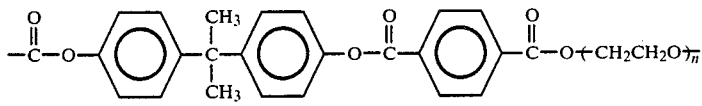

The repeating units each comprise about 50 weight % of the polymer. By standard tests, the tensile modulus is 610 psi; tensile strength 1500 psi. and elongation at break 750%. The block copolymer is elastomeric at ambient temperatures.

PROCEDURE A

For comparison purposes a block-copolymer was made by the procedure of Goldberg in J. Polymer Sci. C., 707 (1962) by condensing 70 g. (0.00875 mole) of polyethylene glycol (MW 8000) and 100 g. (0.438 moles) of bisphenol-A and phosgene in 1000 ml. of pyridine. The polymer had an intrinsic viscosity of 0.86 dl./g. in chloroform and units of the structure

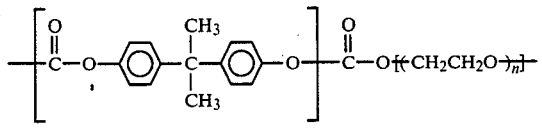

PROCEDURE B

For comparison purposes, an uncapped polyethylene glycol was made into a block copolymer by the general interfacial condensation procedure of Example 5. 71 grams (0.0209 moles) of polyethylene glycol (MW 3400) was phosgenated at 0.75 g/min for 43 min. in the presence of 71 g. (0.311 mole) of bisphenol A, 1 ml. of triethylamine, 450 ml. of water and 600 ml. of methylene chloride. The block copolymer had the structure shown under Procedure A and an intrinsic viscosity of 1.38 dl./g. (in CHCl$_3$).

To demonstrate the advantages of this invention the stability of the block copolymers were compared with one prepared according to the prior art. Samples were heat aged for 24 hours at 75° C. in a static air oven and the intrinsic viscosities were re-measured. The results were as follows:

| Example | Linking Group | Intrinsic Viscosity initial | after aging | % change |
|---|---|---|---|---|
| Procedure A (prior art) | aliphatic carbonate | 0.86 | 0.60 | 30 |
| 5 | ester-phenol | 0.92 | 0.86 | 6.5 |
| 6 | ester-ester | 0.75 | 0.72 | 4 |

It is seen that the use of ester-ester and ester-phenol (or ester-aromatic carbonate) linkages significantly improves the stability of poly(carbonate-ether) block copolymers.

EXAMPLES 9-11

The block copolymer of Example 8 is blended with poly(bisphenol A) carbonate by mixing chloroform solutions, evaporating to dryness and compression molding the blend. The results were as follows:

| Example | wt % Copolymer | Observation | DSC (Tg) Glass transition |
|---|---|---|---|
| 9 | 10 | clear, tough | 124° C. |
| 10 | 25 | clear, tough | 100° C. |
| 11 | 40 | clear, tough | 84° C. |

Compatible blends having high clarity and toughness are obtained.

EXAMPLE 12

The procedure of Example 9 is repeated substituting a 50:50 poly(bisphenol-A/dixylenol sulfone carbonate) for the aromatic polycarbonate and using 25 wt. % of the block copolymer of Example 8. A clear, tough blend with a single glass transition temperature of 185° C. was obtained.

EXAMPLES 13-15

Blends of 25 wt % of the block copolymer of Example 8 and 75 wt % of the following, espective, polymers: styrene-acrylonitrile resin (SAN); poly(2,6-dimethyl-1,4-phenylene ether)(PPO); and 75:25 poly(2,6-dimethyl-1,4-phenylene ether)/crystal polystyrene (PPO/PS) are made by mixing chloroform solutions, evaporating to dryness and molding at 510° F. into films. The unmodified resins are also molded. Toughness is determined by bending the sample over on itself and noting its resistance to cracking. The following results are obtained:

| Example | Composition, wt % Thermoplastic | Example 8 | Observation |
|---|---|---|---|
| 13A* | SAN-100 | — | brittle |
| 13 | SAN-75 | 25 | tough |
| 14A* | PPO/PS-100 | — | brittle |
| 14 | PPO/PS 75 | 25 | tough |
| 15A* | PPO-100 | — | brittle |
| 15 | PPO-75 | 25 | tough |

*Control

The blends according to this invention toughen the otherwise brittle commercially important thermoplastic resins.

All of the foregoing patents and/or publications are incorporated herein by reference. Obviously, other modifications and variations of the present invention are possible in light of the above teachings. It is, therefore, to be understood that changes may be made in the particular embodiments of the invention described which are within the full intended scope of the invention as defined by the appended claims.

I claim:

1. A polycarbonate polyether block copolymer substantially free of aliphatic carbonate linkages, having a mean weight average molecular weight $M_w$ of between about 15,000 and 40,000 and being of the general formula

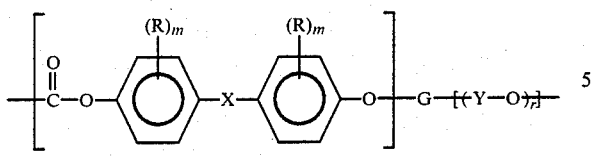

wherein repeating units B comprise soft polyether segments comprising from 5 to 60% by weight of said block copolymer and have mean number average molecular weights $M_n$ of between about 500 and 20,000, and wherein G is

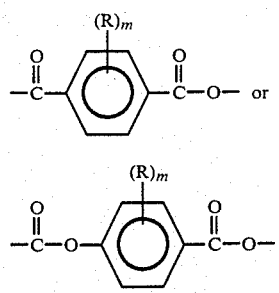

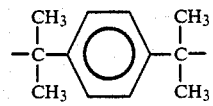

R is hydrogen, chlorine, bromine or alkyl of from 1 to 3 carbon atoms;
m is 1 or 2;
X is a bond or $C_1$-$C_8$ alkylene, $C_2$ to $C_8$ alkylidene, $C_5$ to $C_{15}$ cycloalkylene, $C_5$ to $C_{15}$ cycloalkylidene, $SO_2$, SO, O, CO or

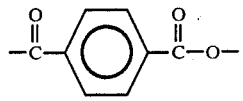

x is 6 to 450; and
Y is $C_2$-$C_{15}$ linear or branched alkylene.

2. A polycarbonate polyether block copolymer as defined in claim 1 wherein

G is

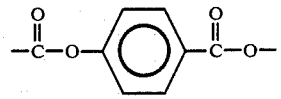

R is hydrogen,
Y is —$CH_2CH_2$— or —$CH_2CH_2CH_2CH_2$—, polyether segments B have a number average molecular weight $M_n$ of about 1500 to 10,000, the block copolymer having an intrinsic viscosity of about 0.5 to about 1.2 dl/g (in $CHCl_3$).

3. A polycarbonate polyether block copolymer as defined in claim 2 wherein Y is —$CH_2CH_2$— and polyether segments B have a number average molecular weight $M_n$ of about 3,400.

4. A polycarbonate polyether block copolymer as defined in claim 2 wherein Y is —$CH_2CH_2$— and polyether segments B have a number average molecular weight $M_n$ of about 8,000.

5. A polycarbonate polyether block copolymer as defined in claim 2 wherein Y is —$CH_2CH_2CH_2CH_2$— and polyether segments B have a number average molecular weight $M_n$ of about 2000.

6. A polycarbonate polyether block copolymer as defined in claim 1 wherein

G is

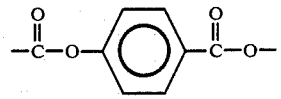

Y is —$CH_2CH_2$— or —$CH_2CH_2CH_2CH_2$—, polyether segments B have a number average molecular weight $M_n$ of about 500 to 10,000, the block copolymer having an intrinsic viscosity of about 0.5–1.2 dl./g. (in $CHCl_3$).

7. A polycarbonate polyether block copolymer as defined in claim 6 wherein

Y is —$CH_2CH_2$— and polyether segments B have a number average molecular weight $M_n$ of about 8,000.

* * * * *